(12) United States Patent
Chen et al.

(10) Patent No.: US 7,586,694 B2
(45) Date of Patent: Sep. 8, 2009

(54) LENS ASSEMBLY

(75) Inventors: Shih-Han Chen, Taipei County (TW); Guo-Fei Gao, Fujian (CN); Lie-Hong Li, Shanxi (CN)

(73) Assignee: Genius Electronic Optical Co., Ltd., Shiang Taichung (TW)

( * ) Notice: Subject to any disclaimer, the term of this patent is extended or adjusted under 35 U.S.C. 154(b) by 0 days.

(21) Appl. No.: 12/025,849

(22) Filed: Feb. 5, 2008

(65) Prior Publication Data

US 2009/0195893 A1 Aug. 6, 2009

(51) Int. Cl.
*G02B 13/18* (2006.01)
*G02B 3/02* (2006.01)
*G02B 9/06* (2006.01)

(52) U.S. Cl. ........................ 359/794; 359/717
(58) Field of Classification Search ................ 359/717, 359/794, 795, 691, 692
See application file for complete search history.

(56) References Cited

U.S. PATENT DOCUMENTS 5,677,798 A * 10/1997 Hirano et al. ............... 359/717

FOREIGN PATENT DOCUMENTS

| CN | 20041002504 A | 8/2004 |
| CN | 20051055986 A | 9/2006 |
| JP | 2001183578 | * 7/2001 |

* cited by examiner

*Primary Examiner*—Alicia M Harrington
(74) *Attorney, Agent, or Firm*—Browdy and Neimark, P.L.L.

(57) ABSTRACT

A lens assembly includes, in order from an object side toward an image side along an optical axis thereof, a first lens having positive refractive power, and a second lens. The lens assembly satisfies the following conditions: $0<|f1/f|<2$ and $0<|f2/f|<7$, wherein f is an effective focal length of the lens assembly, f1 is an effective focal length of the first lens, and f2 is an effective focal length of the second lens. The first lens has at least one spherical surface, thus effectively decreasing the production cost of the lens assembly.

3 Claims, 8 Drawing Sheets

LENS ASSEMBLY

BACKGROUND OF THE INVENTION

1. Field of the Invention

The present invention relates generally to camera lenses, and more particularly, to a low-aberration compact lens assembly.

2. Description of the Related Art

As the digital cameras have been popular and numerously applied to various kinds of electronic products, requirement of the electronic products for high quality and miniaturization is also applied to the built-in lens assembly of the digital cameras. In consideration of compactness and effectively overcoming a variety of aberrations for the overall optical imaging, the lens of the digital camera is not only usually made of resin material, which is transparent to visible light, to be lighter than the lens made of glass, but also possessed of good plasticity for production of a variety of aspheric lenses, such that a compact lens assembly having less lens groups but the optimum quality for image pickup under required optical conditions can be fulfilled.

As for a lens for image pickup disclosed in China Patent Application No. 200410002504.3 filed by Milestone Co., Ltd. and a single-focus lens disclosed in China Patent Application No. 200510055986.3 filed by Fujinon Corporation, each of them is composed of two lenses, in which the surface of each lens is aspheric. When a specific condition is satisfied for each lens, the aspheric surfaces can correct the aberrations of the overall optical image forming, like chromatic aberration, spherical aberration, comatic aberration, field curvature, distortion, and astigmatism, to fulfill the best quality.

However, compared with the general spherical lens in practice, the surfaces of the aspheric lens made of resin are of variations of high-precise geometrical conditions. Under the circumstances, the abrasive and polishing approaches for production of the aspheric lens in low temperature are highly sensitive to process operations, such that the more the aspheric lenses the lenses are required, the more complex the production engineering of the lenses is and the higher the production cost is.

SUMMARY OF THE INVENTION

The primary objective of the present invention is to provide a lens assembly, which includes a lens with at least one spherical surface and incorporates simple optical conditions, but achieving low aberration and high quality.

The foregoing objective of the present invention is attained by the lens assembly comprises, in order from an object side toward an image side along an optical axis thereof, a first lens with positive refractive power and a second lens. At least one surface of the first lens is a spherical surface. The second lens has two aspheric surfaces. The lens assembly of the present invention satisfies the following conditions: $0<|f1/f|<2$ and $0<|f2/f|<7$, wherein f is an effective focal length of the lens assembly, f1 is an effective focal length of the first lens, and f2 is an effective focal length of the second lens.

The at least one spherical surface of the first lens can be simply prepared to effectively lower the production cost of the lens assembly and the combination of the two lenses satisfying the above-mentioned condition can effectively reduce the spherical aberration and correct the filed curvature to further minimize the overall optical aberration of the lens assembly. In light of this, the present invention provides not only simple and low-cost production but also better quality.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF PREFERRED EMBODIMENTS

Figure 1:
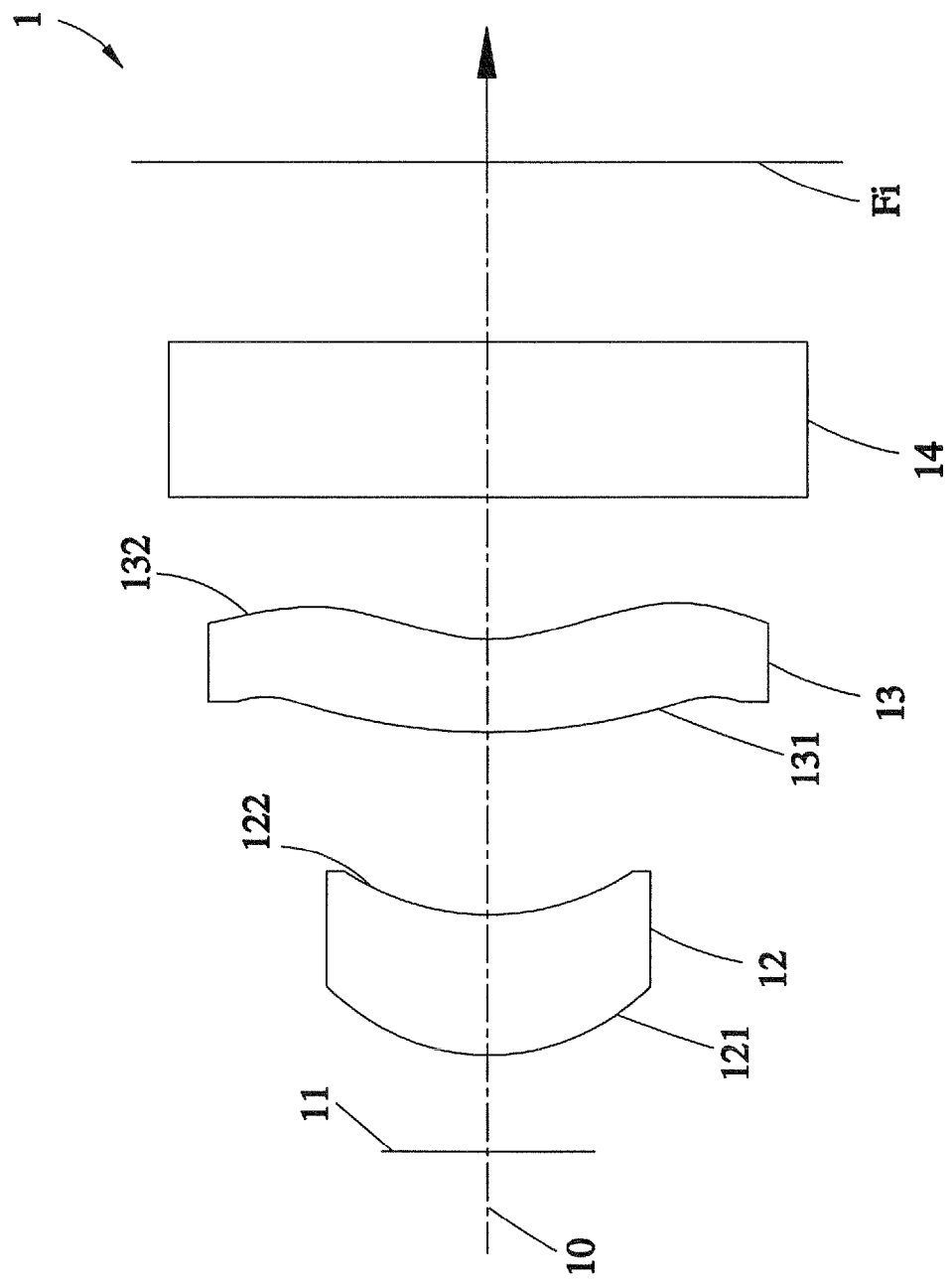
FIG. 1 is a schematic structural drawing of a lens assembly in accordance with a first preferred embodiment of the present invention.

Referring to FIG. 1, a lens assembly 1 applied to a digital camera and constructed based on a first preferred embodiment of the present invention comprises, in order from an object side toward an image side along an optical axis 10, an aperture stop 11, a first lens 12, a second lens 13, and a lens protector 14.

The aperture stop 11 is adjustable to confine ray bundles for effectively entering the lens assembly 1 to further enable the optical path to pass through the first and second lenses 12 and 13 and the lens protector 14 and then focus onto a focal plane of the digital camera for image pickup.

The first lens 12 is a meniscus-shaped converging lens, which can be made of glass or resin, having positive refractive power, and satisfying the condition: 0<|f1'/f1|<2, in which f1' represents the effective focal length of the first lens 12 and f1 is the effective focal length of the lens assembly 1. In this embodiment, the first lens 12 is provided by the condition of |f1'/f1|=1.444 with a spherical convex surface 121 facing the object side and an aspheric concave surface 122 facing the image side.

The second lens 13 is a wave-shaped converging lens with two aspheric surfaces 131 and 132 structured as a centered convex portion and a decentered concave portion facing the object side, which can be made of glass or resin, having positive refractive power, and satisfying the condition: 0<|f1''/f1|<7, in which f1'' represents the effective focal length of the second lens 13 and f1 is the effective focal length of the lens assembly 1 as mentioned above. In this embodiment, the second lens 13 satisfies the condition: |f1''/f1|=2.316.

The lens protector 14 can be any cover lens like an IR-cut (infrared cutoff) filter or a low-pass filter.

In the lens assembly 1, each of the aspheric surfaces 122, 131, and 132 satisfies the following condition:

$$z = \frac{cr^2}{1+\sqrt{1-(1+k)c^2r^2}} + \sum_{i=1}^{8} \alpha_i r^{2i},$$

wherein z represents a sag amount which is defined as a distance from a point on the aspheric surface to a tangential plane of the aspheric surface vertex, c is a paraxial curvature, r is a height of a point on the aspheric surface with respect to the optical axis, k is a conic constant, and $\alpha_i$ is the $i^{th}$-order aspheric coefficient.

Figure 3:
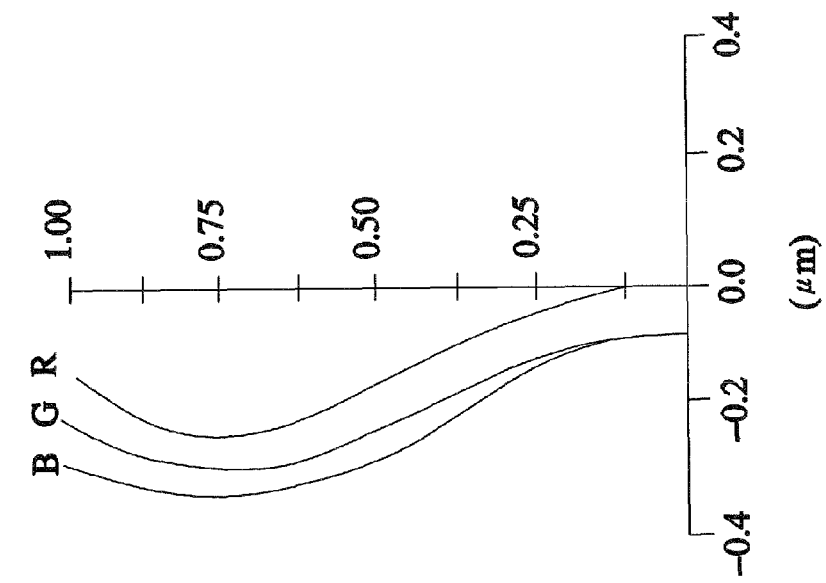
FIG. 3 is a graph of spherical aberration and chromatic aberration exhibited by the lens assembly in accordance with the first preferred embodiment of the present invention.
Figure 2:
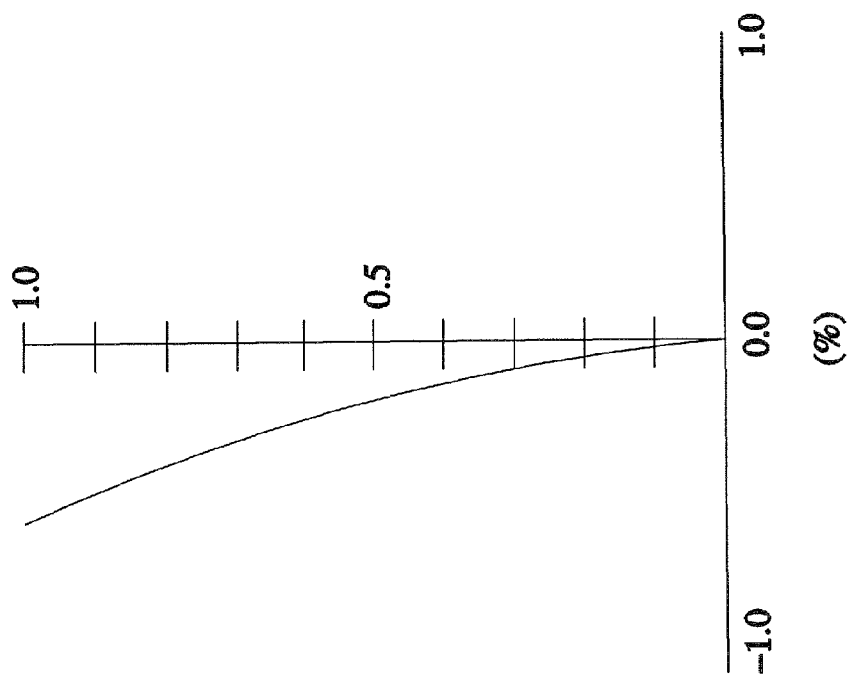
FIG. 2 is a graph of distortion exhibited by the lens assembly in accordance with the first preferred embodiment of the present invention.

FIGS. 2 and 3 illustrate the image pickup characteristics of the lens assembly 1 close to a field stop Fi on the focal plane. Referring to FIG. 2, the distortion aberration curve shows that the aberration of image at the maximum off-axis height with respect to the projected height on the field stop Fi can remain negative distortion smaller than 1%. Referring to FIG. 3, as known from the chromatic aberration of the lens assembly 1, with respect to the image of red light source, the spherical aberration of image at the relative off-axis height can remain smaller than 0.4 μm within the range of visible light.

To sum it up, the lens assembly 1 can effectively lower the production cost thereof because the spherical convex surface 121 can be simply prepared. Besides, the combination of the aspheric concave surface 122 and the spherical convex surface 121 can effectively minimize the spherical aberration of the first lens 12. Moreover, the incident ray first passes through the first lens 12, whose focal length is shorter than that of the second lens 13, for converging more light to strengthen the image intensity of the lens assembly 1 and to decrease the aberration resulted by the off-axis light. In the meantime, the aspheric second lens 13 having longer focal length can correct the field curvature most probably caused by the first lens 12 and minimize the overall optical aberration of the lens assembly 1. Therefore, in comparison with the conventional optical lens fully composed of the aspheric lenses, the present invention not only can be prepared in low cost and simplicity but also can achieve better quality.

Figure 4:
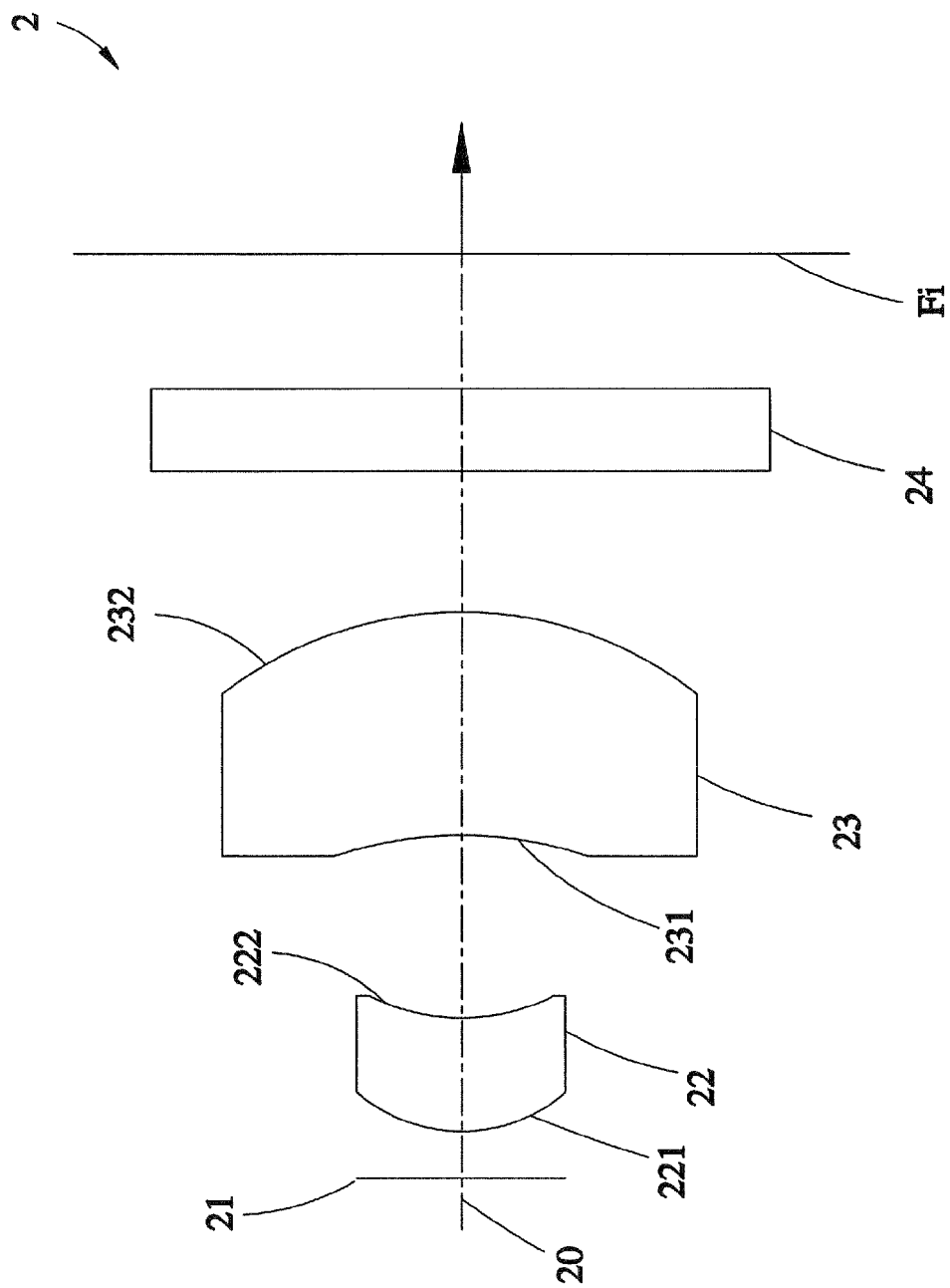
FIG. 4 is a schematic structural drawing of a lens assembly in accordance with a second preferred embodiment of the present invention.

Referring to FIG. 4, a lens assembly 2 constructed based on a second preferred embodiment of the present invention comprises, in order from the object side toward the image side along an optical axis 20, an aperture stop 21, a first lens 22, a second lens 23, and a lens protector 24.

The first lens 22 has a spherical surface 221 and an aspheric surface 222. The first lens 22 satisfies the condition: |f2'/f2|=0.999, in which f2' represents the effective focal length of the first lens 22 and f2 is the effective focal length of the lens assembly 2.

The second lens 23 is a meniscus-shaped converging lens having an aspheric concave surface 231 facing the object side and an aspheric convex surface 232 facing the image side. The second lens 23 satisfies the condition: |f2''/f2|=4.768, in which f2'' represents the effective focal length of the second lens 23 and f2 is the effective focal length of the lens assembly 2, thereby more effectively minimizing the spherical aberration of the first lens 22.

In the lens assembly 2, each of the aspheric surfaces 222, 231, and 232 also satisfies the following condition:

$$z = \frac{cr^2}{1+\sqrt{1-(1+k)c^2r^2}} + \sum_{i=1}^{8} \alpha_i r^{2i},$$

wherein z represents a sag amount which is defined as a distance from a point on the aspheric surface to a tangential plane of the aspheric surface vertex, c is a paraxial curvature, r is a height of a point on the aspheric surface with respect to the optical axis, k is a conic constant, and $\alpha_i$ is the $i^{th}$-order aspheric coefficient.

Figure 6:
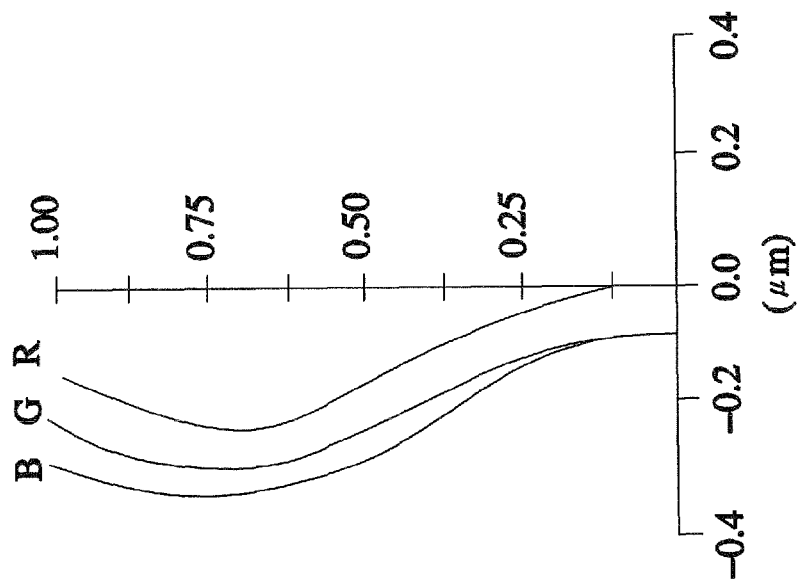
FIG. 6 is a graph of spherical aberration and chromatic aberration exhibited by the lens assembly in accordance with the second preferred embodiment of the present invention.
Figure 5:
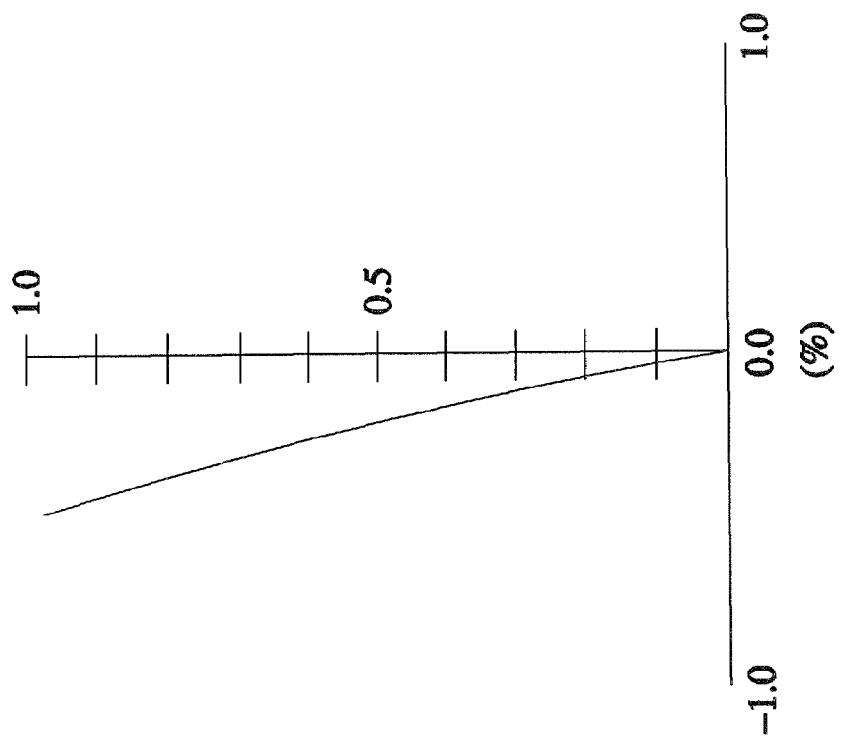
FIG. 5 is a graph of distortion exhibited by the lens assembly in accordance with the second preferred embodiment of the present invention.

FIGS. 5 and 6 illustrate the image pickup characteristics of the lens assembly 2 close to a field stop Fi on the focal plane. Referring to FIG. 5, the distortion aberration curve shows that the aberration of image at the maximum off-axis height with respect to the projected height on the field stop Fi can remain negative distortion smaller than 1%. Referring to FIG. 6, as known from the chromatic aberration of the lens assembly 2, with respect to the image of red light source, the spherical aberration of image at the relative off-axis height can remain smaller than 0.4 μm within the range of visible light.

Figure 7:
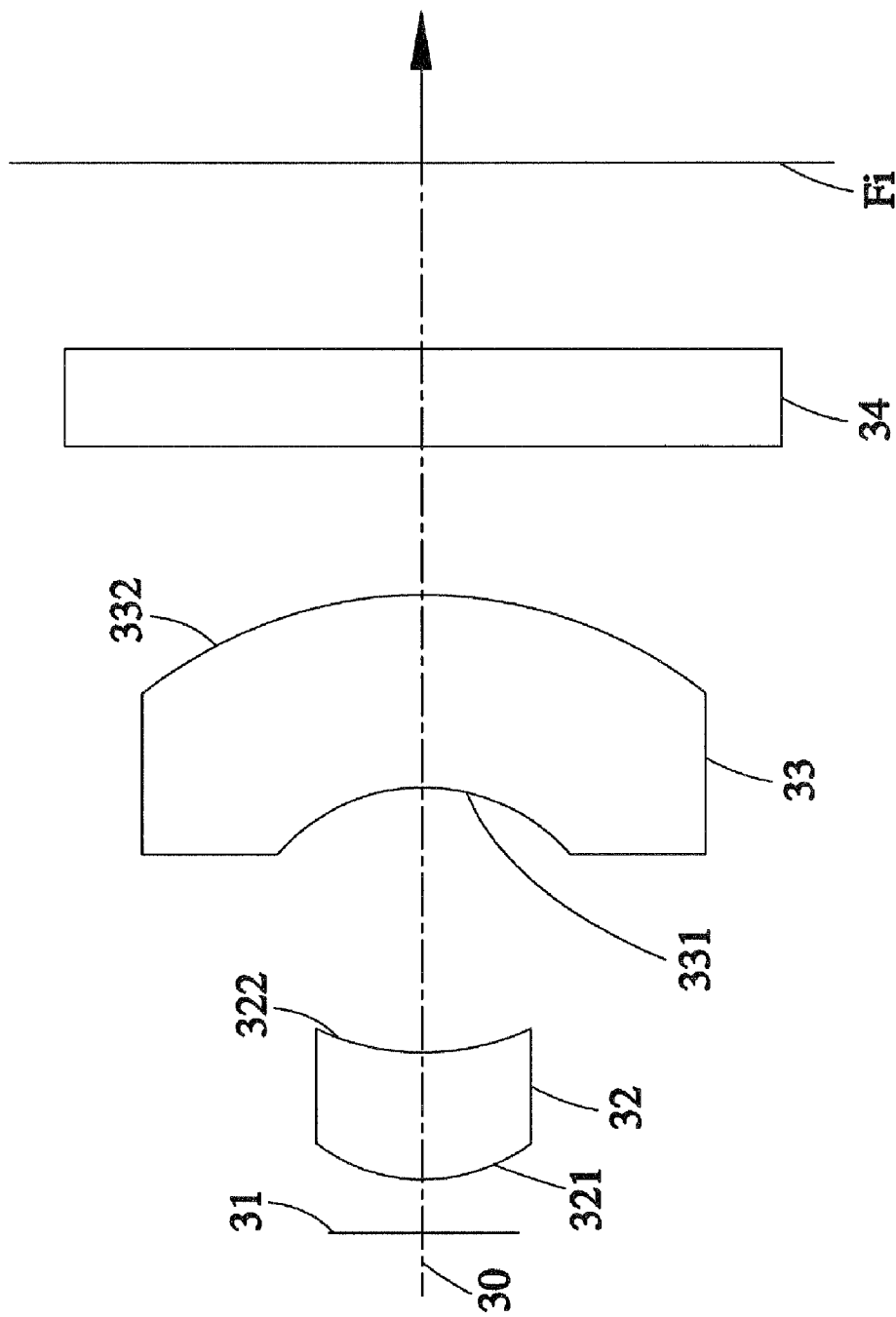
FIG. 7 is a schematic structural drawing of a lens assembly in accordance with a third preferred embodiment of the present invention.

Referring to FIG. 7, a lens assembly 3 constructed based on a third preferred embodiment of the present invention comprises, in order from the object side toward the image side along an optical axis 30, an aperture stop 31, a first lens 32, a second lens 33, and a lens protector 34.

The first lens 32 has a spherical surface 321 and an aspheric surface 322. The first lens 32 satisfies the condition: |f3'/f3|=0.891, in which f3' represents the effective focal length of the first lens 32 and f3 is the effective focal length of the lens assembly 3.

The second lens 33 is a meniscus-shaped diverging lens with negative refractive power. The second lens 33 satisfies the condition: |f3''/f3|=3.608, in which f3'' represents the effective focal length of the second lens 33 and f3 is the effective focal length of the lens assembly 3. The second lens 33 has an aspheric concave surface 331 facing the object side and an aspheric convex surface 332 facing the image side, more effectively minimizing the distortion and the spherical aberration of the first lens 32.

In the lens assembly 3, each of the aspheric surfaces 322, 331, and 332 also satisfies the following condition:

$$z = \frac{cr^2}{1+\sqrt{1-(1+k)c^2r^2}} + \sum_{i=1}^{8} \alpha_i r^{2i},$$

wherein z represents a sag amount which is defined as a distance from a point on the aspheric surface to a tangential plane of the aspheric surface vertex, c is a paraxial curvature, r is a height of a point on the aspheric surface with respect to the optical axis, k is a conic constant, and $\alpha_i$ is the $i^{th}$-order aspheric coefficient.

Figure 9:
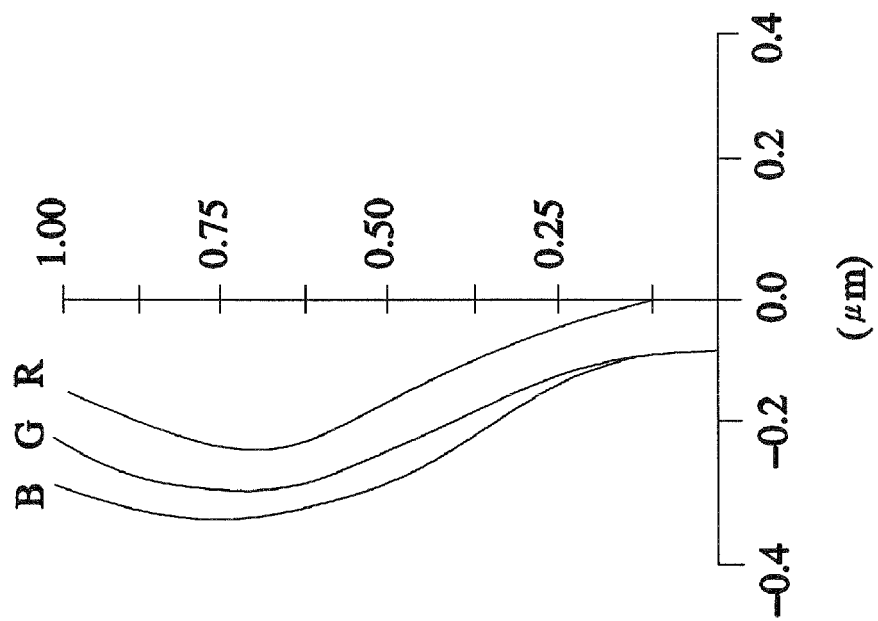
FIG. 9 is a graph of spherical aberration and chromatic aberration exhibited by the lens assembly in accordance with the third preferred embodiment of the present invention.
Figure 8:
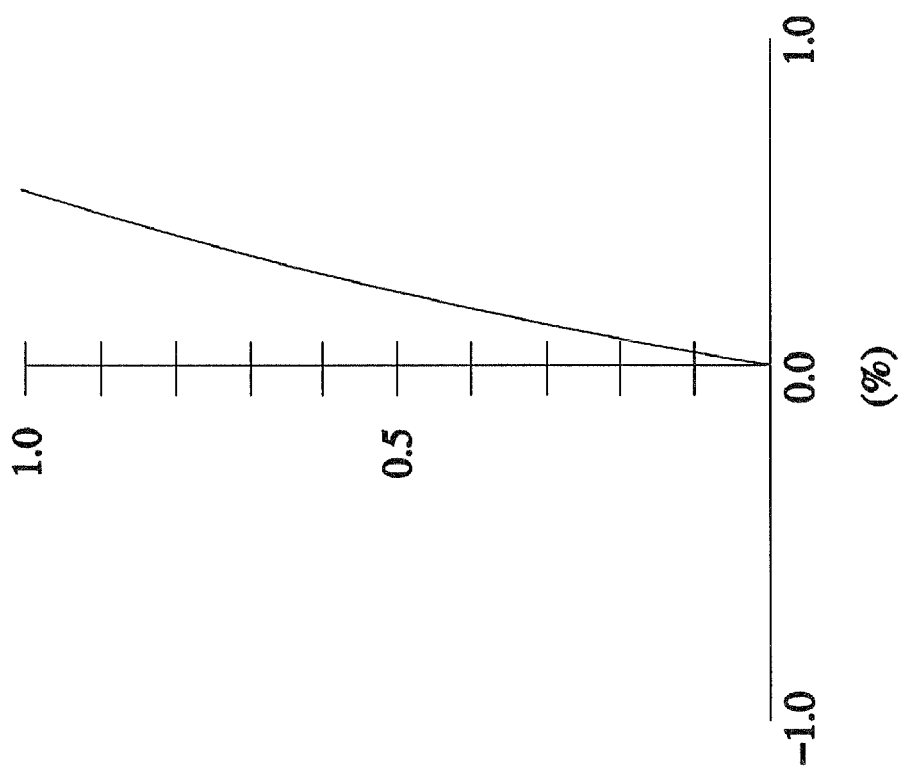
FIG. 8 is a graph of distortion exhibited by the lens assembly in accordance with the third preferred embodiment of the present invention.

FIGS. 8 and 9 illustrate the image pickup characteristics of the lens assembly 3 close to a field stop Fi on the focal plane. Referring to FIG. 8, the distortion aberration curve shows that the aberration of image at the maximum off-axis height with respect to the projected height on the field stop Fi can remain positive distortion smaller than 1%. Referring to FIG. 9, as known from the chromatic aberration of the lens assembly 3, with respect to the image of red light source, the spherical aberration for of image at the relative off-axis height can remain smaller than 0.4 μm within the range of visible light.

Figure 10:
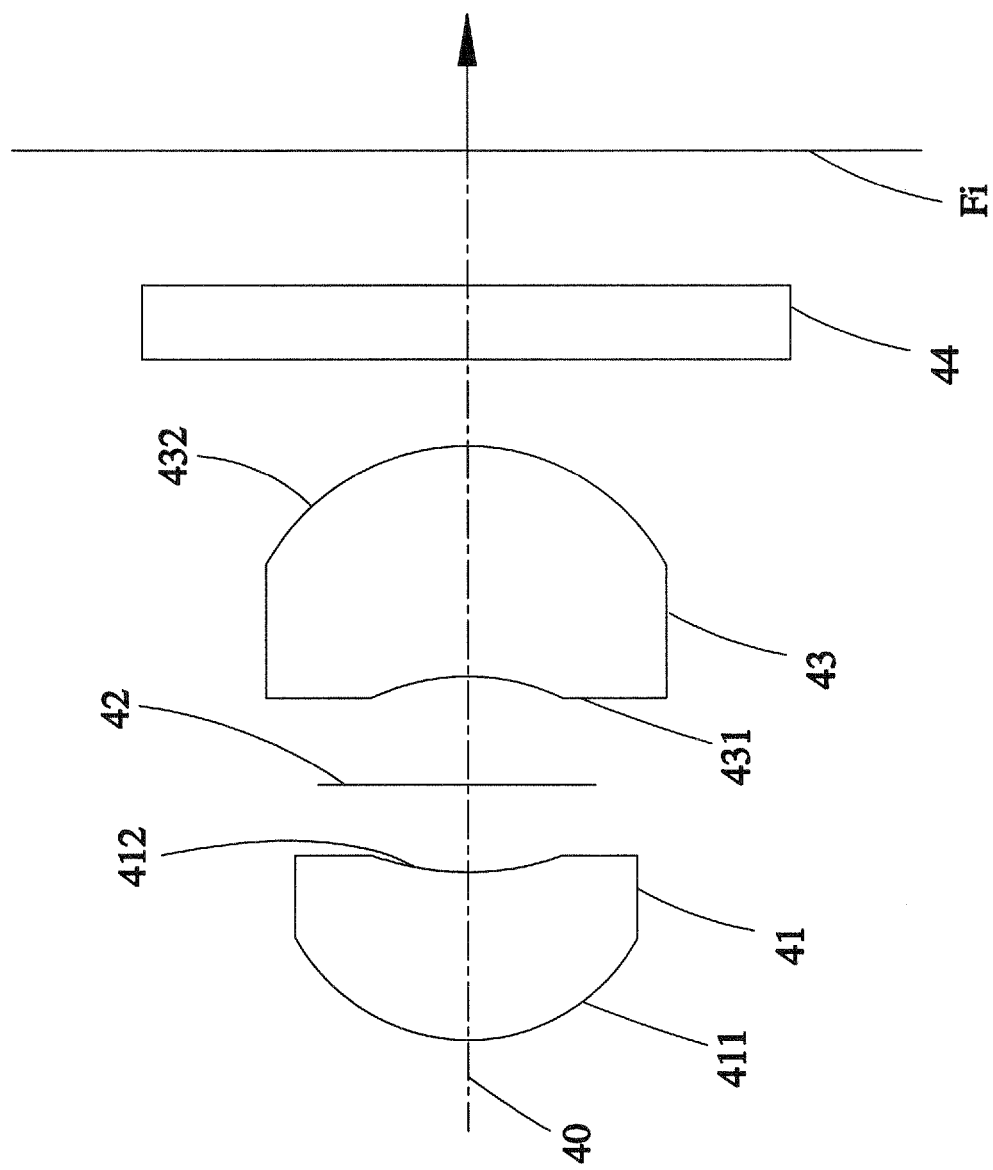
FIG. 10 is a schematic structural drawing of a lens assembly in accordance with a fourth preferred embodiment of the present invention.

Referring to FIG. 10, a lens assembly 4 constructed based on a fourth preferred embodiment of the present invention comprises, in order from the object side toward the image side along an optical axis 40, a first lens 41, an aperture stop 42, a second lens 43, and a lens protector 44.

The first lens 41 has a spherical surface 411 and an aspheric surface 412. The first lens 41 satisfies the condition: |f4'/f4|=1.235, in which f4' represents the effective focal length of the first lens 41 and f4 is the effective focal length of the lens assembly 4.

The second lens 43 is a meniscus-shaped converging lens satisfying the condition: |f4"/f4|=1.496, in which f4" represents the effective focal length of the second lens 43, which is slightly larger than that of the first lens 41 to converge more effective light. The second lens 43 has an aspheric concave surface 431 facing the object side and an aspheric convex surface 432 facing the image side.

The aperture stop 42 is located between the first and second lenses 41 and 43 for filtering the surrounding light around the ray bundles after the light passes through the first lens 41 of short focal lengths, thereby confining the incident rays of the second lens as paraxial rays, thus fulfilling best quality.

In the lens assembly 4, each of the aspheric surfaces 412, 431, and 432 also satisfies the following condition:

$$z = \frac{cr^2}{1+\sqrt{1-(1+k)c^2 r^2}} + \sum_{i=1}^{8} \alpha_i r^{2i},$$

wherein z represents a sag amount which is defined as a distance from a point on the aspheric surface to a tangential plane of the aspheric surface vertex, c is a paraxial curvature, r is a height of a point on the aspheric surface with respect to the optical axis, k is a conic constant, and $\alpha_i$ is the $i^{th}$-order aspheric coefficient.

Figures 11, 12:
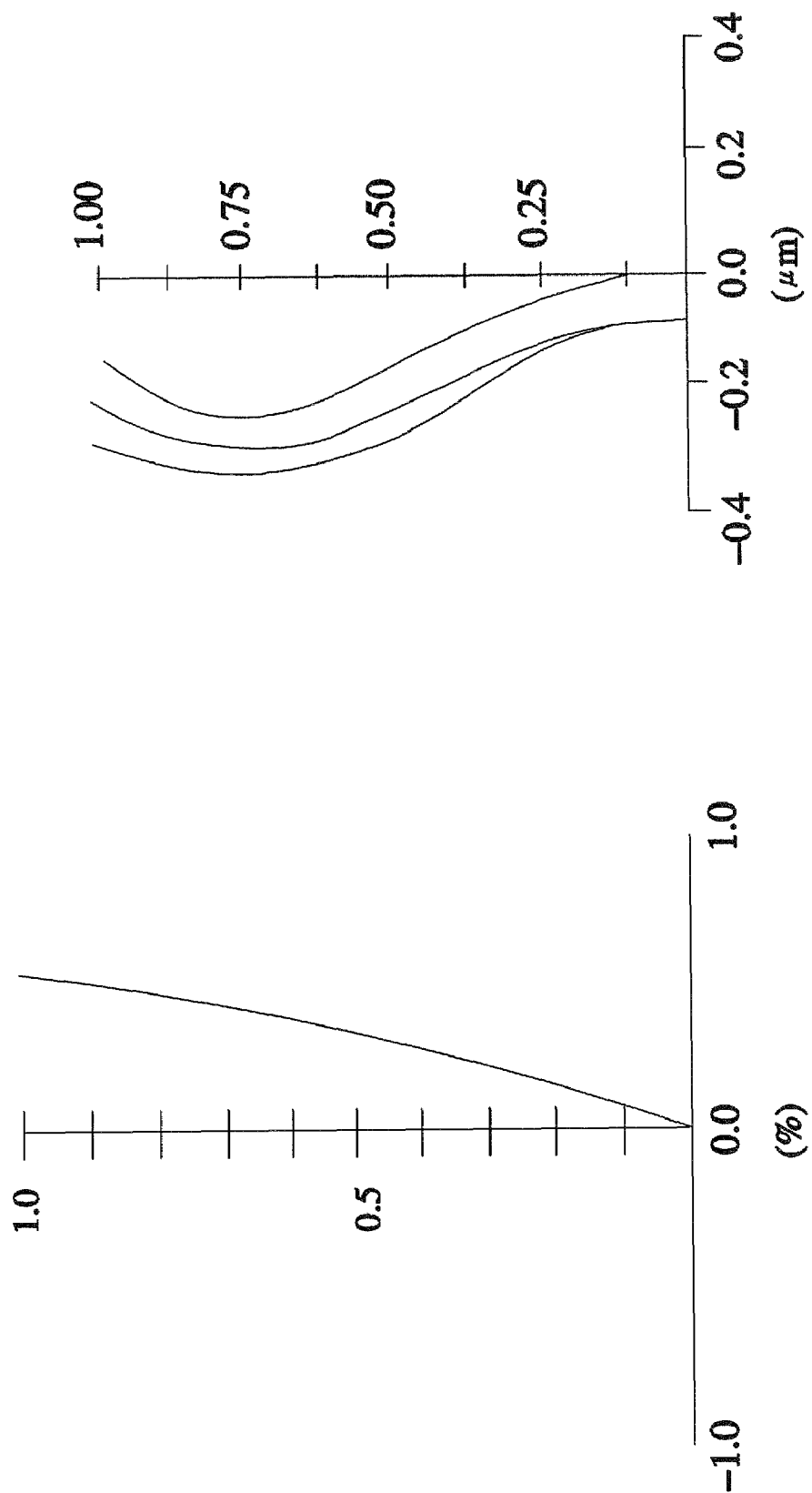
FIG. 11 is a graph of distortion exhibited by the lens assembly in accordance with the fourth preferred embodiment of the present invention.
FIG. 12 is a graph of spherical aberration and chromatic aberration exhibited by the lens assembly in accordance with the fourth preferred embodiment of the present invention.

FIGS. 11 and 12 illustrate the image pickup characteristics of the lens assembly 4 close to a field stop Fi on the focal plane. Referring to FIG. 11, the distortion aberration curve shows that the aberration of image at the maximum off-axis height with respect to the projected height on the field stop Fi can remain positive distortion smaller than 1%. Referring to FIG. 12, as known from the chromatic aberration of the lens assembly 4, with respect to the image of red light source, the spherical aberration of image at the relative off-axis height can remain smaller than 0.4 μm within the range of visible light.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lens assembly, in an order from an object side toward an image side along an optical axis thereof:
    a first lens with positive refractive power having two surfaces, at least one of said two surfaces being a spherical surface; and
    a second lens having two aspheric surfaces; and
    said lens assembly satisfying the following conditions:
    0<|f1/f2|<2 and
    0<|f2/f|<7,
    wherein f is an effective focal length of the lens assembly, f1 is an effective focal length of the first lens, and f2 is an effective focal length of the second lens,
    wherein said first lens is a meniscus-shaped converging lens, the two surfaces of said first lens include a convex surface facing the object side and a concave surface facing the image side,
    wherein said second lens is a wave-shaped converging lens having positive refractive power, one of the two aspheric surfaces of said second lens has a centered convex portion facing the object side, and the other of the two aspheric surface has a centered concave portion facing the image side.

2. The lens assembly as defined in claim 1, wherein said second lens is a meniscus-shaped converging lens having positive refractive power; the two surfaces of the said second lens include a concave surface facing the object side, and a convex surface facing the image side.

3. The lens assembly as defined in claim 1, further comprising an aperture stop located at a position in front of said first lens, wherein ray bundles of a light admitted through said aperture stop are substantially equal to ray bundles of the light entering said first lens.

* * * * *